United States Patent [19]
Locus

[11] 3,972,043
[45] July 27, 1976

[54] CROSS-POLARIZING LENS REFLECTOR

[75] Inventor: Silvan Stanley Locus, Van Nuys, Calif.

[73] Assignee: Northrop Corporation, Los Angeles, Calif.

[22] Filed: Feb. 3, 1975

[21] Appl. No.: 546,692

[52] U.S. Cl. ............................ 343/18 B; 343/756; 343/909; 343/911 L
[51] Int. Cl.² ........................................ H01Q 15/22
[58] Field of Search .............. 343/18 B, 909, 911 L

[56] References Cited
UNITED STATES PATENTS

| | | | |
|---|---|---|---|
| 3,251,061 | 5/1966 | Diamond | 343/18 B |
| 3,737,904 | 6/1973 | Mori et al. | 343/18 B |
| 3,896,440 | 7/1975 | Wheeler | 343/18 B X |
| 3,938,151 | 2/1976 | Trenam | 343/18 B |

*Primary Examiner*—T.H. Tubbesing
*Attorney, Agent, or Firm*—William W. Rundle; Willard M. Graham

[57] ABSTRACT

A Luneberg lens with a polarization-sensitive spherical "leaky" reflector cap having conductive strips aligned at a 45° angle to the linear polarization of the incident wave. The ratio of strip width to strip spacing is preferably chosen to reflect back a cross-polarized component about −10 db below the reflected self-polarized component. The strip width is small as compared to the focal spot diameter of the lens for any given incident wave direction and also small as compared to the wavelength of the incident wave. The lens and reflector can be used in small drone aircraft to simulate the radar cross section of a larger body such as an aircraft whose radar cross section causes reflected polarization components not present in the incident field. The full specification must be consulted for an understanding of the invention.

6 Claims, 5 Drawing Figures

CROSS-POLARIZING LENS REFLECTOR

BACKGROUND OF THE INVENTION

The present invention relates to means for enhancing the radar return of a body such as an aerospace vehicle, and more particularly, to means providing a desired fraction of cross-polarization in the return.

The scattered electromagnetic field from a body with edges, such as an aircraft, contains polarization components that are not present in the incident field. This is commonly referred to as cross-polarization. Small target drone aircraft or similar bodies used for electronic countermeasure purposes often include reflective augmenters to enlarge the size of a radar return signal from it to simulate a larger craft. The resulting radar return signal has virtually no cross-polarization in it, however, and thus does not realistically simulate the desired aircraft or other object. A level of −10 db below the self-polarization has been commonly taken as a reasonable estimate of the actual cross-polarization in the radar cross section of typical (unaugmented) aircraft.

It is an object of the present invention to provide a retro-directive lens system having a radar cross section that reflects back a cross-polarized component having a desired magnitude compared to the self-polarized component to provide the best possible simulation of a given object or body.

At the same time, another object is to provide such a cross-polarizing reflector having no loss or degradation in the extent of directional response from that of a conventional Luneberg lens reflector.

One known type of reflector producing cross-polarization consists of a Luneberg lens, the entire surface of which is covered with a 45° wire grid structure and is known in the art as a bird cage Luneberg reflector. As is known by those skilled in the art, this reflector produces nearly equal self and cross-polarization in the reflected signal from an incident wave of vertical polarization. This would not be suitable to solve the present problem.

Another cross-polarization device is a dihedral corner reflector arranged with its V-intersection line in a vertical plane and inclined 45° to the left or right of an incident horizontally or vertically polarized wave. But this structure produces a complete conversion of self-polarization into cross-polarization, and is therefore not suitable for the present purpose.

BRIEF SUMMARY OF THE INVENTION

Briefly, my invention comprises a retro-directive lens having a special strip reflector in the focal surface thereof, this reflector having strips of reflective material aligned at 45°, for example, to the E vector of the incoming linearly polarized electromagnetic wave. In this specification, focal "surface" refers to the entire surface locus where incoming radar type signals or electromagnetic waves from any and all directions may be brought to a focus. Focal "spot" means only the one small region within the focal surface where any one particular incident wave is brought to a focus. The particular ratio of reflective strip width to strip spacing is chosen which will produce the desired cross-polarization in the reflected signal. The pattern of strips is directed so that the 45° alignment, for example, is maintained for any and all incident waves arriving from within a 140° or larger solid angle forward of the lens. The width of the reflective strips is small compared to the wavelength of the intended signal to be reflected. Also, several strips should appear at each focal spot, so that the behavior of the strip pattern is substantially uniform as the relative direction of the incoming wave changes.

DETAILED DESCRIPTION

Figure 1:
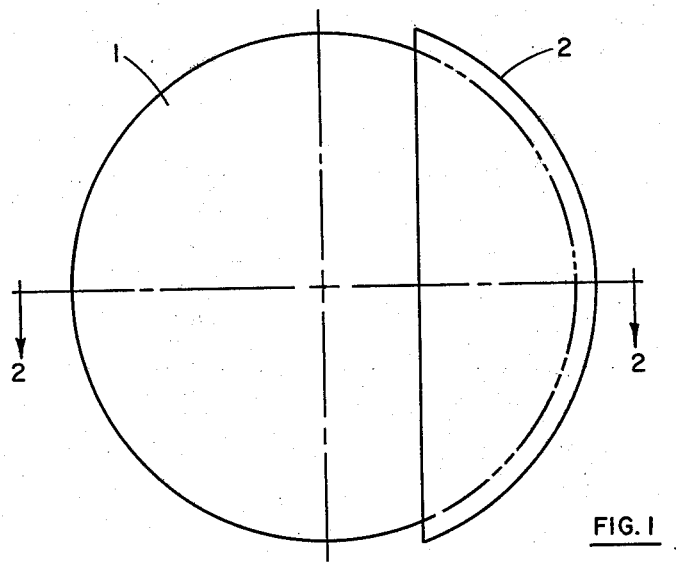
FIG. 1 is a left side elevation view of a lens and reflector embodying the present invention.
Figure 2:
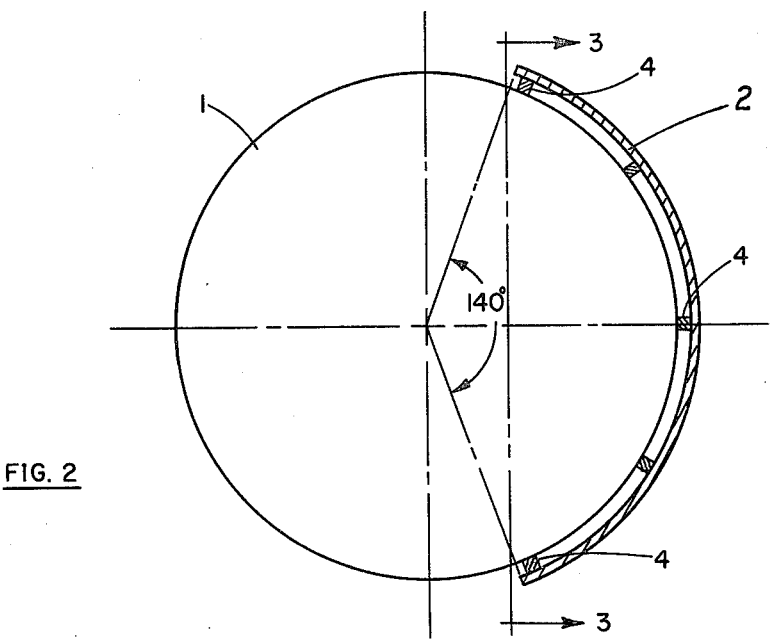
FIG. 2 is a sectional view of the lens and reflector taken as indicated by the line 2—2 in FIG. 1, omitting the interior of the lens.

FIGS. 1 and 2 show a preferred embodiment of my invention, which includes a Luneberg lens 1 and a spherical shaped reflector 2. Reflector 2 is placed in the focal surface of the Luneberg lens 1, which in some lenses is exactly on the surface of the spherical lens and in other lenses is spaced outwardly a short distance. The present reflector 2 is illustrated spaced from the lens, for clarity, by a few radio-transparent plastic spacers 4, such as styrofoam, bonded in place. In other cases, the reflector 2 would be attached directly to the rear side of the lens.

Figure 3:
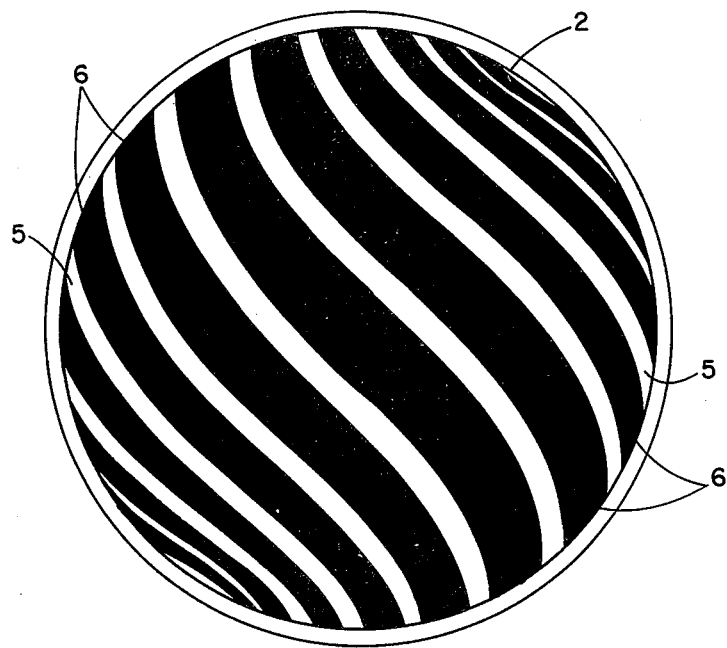
FIG. 3 is a front view of the reflector on an enlarged scale, viewed as indicated by the line 3—3 in FIG. 2.

The reflector 2 comprises a plastic substrate 5 and a plurality of conductive reflective strips 6 provided on its forward or inner surface. As seen from FIG. 3, the strips 6 extend at 45° to the vertical in the focal spot of an incident wave of vertical polarization E (FIG. 4) coming into the front of the lens 1 from any direction throughout a solid angle of 140°. In other words, considering the Luneberg lens as the earth having lines of latitude and longitude, then looking diametrically through the lens at any front point within the angular range or extent of the reflector, the strips 6 at the focal spot always bisect the angle between the latitude and longitude lines at that point. Such a conductive line pattern is known in the prior art as the "bird cage" reflector mentioned previously wherein the curved wire grid structure completely surrounds the Luneberg lens, as in U.S. Pat. No. 3,251,061, for example. In the present case, since the reflector 2 is not quite a complete hemisphere, the curved strips do not have to converge together at the "poles"; hence they stop at the outer edge of the reflector as shown in FIG. 3.

In the present invention, the width of strips 6 at the "equator" of the lens is about ⅛ of the wavelength to be used, and the ratio of strip width to the space between strips is about 12.5 to 1 for a −10 db cross-polarization. As the strips approach the top center and bottom center of the Luneberg lens, they are tapered narrower due to crowding but the ratio of width to spacing is maintained the same. When the strip width is determined for use with a certain wavelength, this is considered the maximum width; the narrower width as the strips taper down is also workable at the same wavelength of course. For practical considerations, the maximum strip width may be anywhere from about 1/5 wavelength to about 1/20 wavelength.

Figure 5:
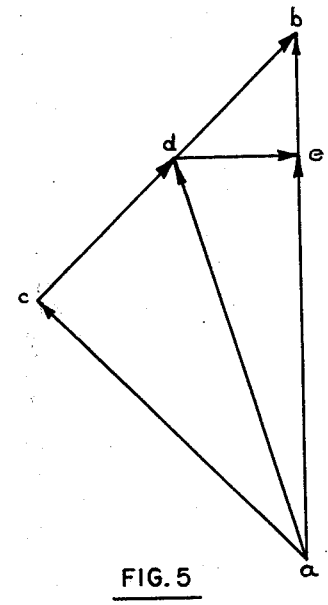
FIG. 5 is a vector diagram used in explaining the cross-polarization of the present invention.

Operation of this invention is as follows. Incident E polarization along the reflective strips as is completely reflected. Incident E polarization perpendicular to the strips is partially transmitted and partially reflected. The greater the ratio of the width of the strips to the width of the gap or space between them, the less the transmission. By orienting these strips at 45° to an incident polarization, a given ratio of cross-polarization to self-polarization can be obtained by selecting the amount of energy transmitted (lost) through the reflector pattern. In FIG. 5, line ab represents the incident (vertical) E field. Line ac is the component along the 45° strips and is essentially totally reflected. Line cb is the component perpendicular to the strips which is partially reflected and partially transmitted. Let line cd be the reflected portion. Then the vector sum of cd and ac (which is ad) is the total reflected vector from the lens system. Vector ad can be resolved into a self-polarized component ae and a cross-polarized component de. By varying the width of the strips 6 in relation to the width of the spaces between them, the desired percentage of cross-polarization in the total reflected radiation can be obtained. That is, the ratio of de to ae is controlled.

I have found that by making the ratio of strip width to strip spacing be approximately 12 or 12.5 to 1 as mentioned before, the cross-polarization in the reflected wave will be −10 db below the self-polarization and thus achieve essentially the same radar cross section action as a large aircraft.

In one embodiment of this invention, a 7-inch (17.8 cm.) Luneberg lens was used, with an incident microwave frequency of 9.8 GHz. The focal surface of this lens was one-half inch (1.27 cm.) behind the lens surface. The diameter of the focal spot for the 9.8 GHz signal was determined to be substantially one-half inch (1.27 cm.), or slightly less than a half wavelength at 9.8 GHz, the wavelength at this frequency being 3.06 cm. Conductive strips having a width of 0.125 inch (3.18 mm.) with a spacing of 0.01 inch (0.25 mm.) at the equator allowed about 3.7 strips to appear in the focal spot. This is considered a sufficient number. The focal spot diameter varies at a 1:1 ratio with the wavelength, and this diameter is approximately one-half a wavelength.

Figure 4:
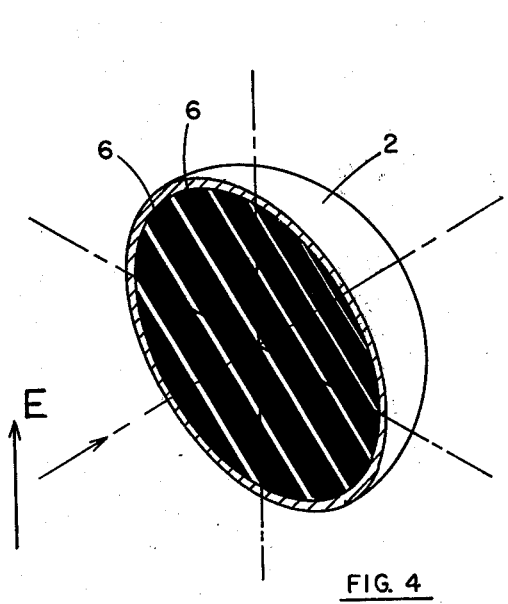
FIG. 4 is an isometric view of the reflector, showing the reflective strips on the inner surface.

The size, number, and relative width of the reflective strips 6 in FIGS. 3 and 4 are not drawn to scale. The strips may be copper from evaporated deposition, then selectively removed, and plated to the desired thickness on the substrate 5, or deposited on or affixed to the substrate in any other suitable manner. The strips can be inclined at 45° either to the left or to the right of any incident linearly polarized electric field vector or aligned in any direction for a circularly polarized incident vector. As can be seen, this reflector is usable throughout a solid angle range of at least 140°, which is ample for essentially any application wherein simulation of an oncoming vehicle is desired.

Thus it is seen that a retro-directive lens and reflector combination has been provided which produces a desired ratio of cross-polarization to self-polarization in the return of a microwave radar signal therefrom. Ratios other than 1 to 10 can obviously be obtained by varying the ratio of reflective strip width to gap width. By decreasing the ratio of strip width to gap, i.e., making the gap relatively wider, the percentage of cross-polarization in the return signal is increased.

Further, it is pointed out that the present reflector invention is not limited to use with a Luneberg lens. It is applicable to any retro-directive lens system, of which there are several types.

In addition, the present device is completely passive in nature, requiring absolutely no operating power input or active components.

While in order to comply with the statute, the inventions has been described in language more or less specific as to structural features, it is to be understood that the invention is not limited to the specific features shown, but that the means and construction herein disclosed comprise the preferred mode of putting the invention into effect, and the invention is therefore claimed in any of its forms or modifications within the legitimate and valid scope of the appended claims.

What is claimed is:

1. A passive cross-polarizing radar reflector comprising spaced strips of reflecting material aligned at 45° to the E vector of a linearly polarized incoming electromagnetic wave, the width of each strip being small compared to the wavelength of the incoming wave, and the ratio of strip width to spacing being from about 12:1 to 13:1, thereby giving a cross-polarization in the reflector return about −10 db below the self-polarization in the return.

2. Passive cross-polarizing radar reflector means comprising spaced strips of reflecting material aligned at 45° to the E vector of a linearly polarized incoming electromagnetic wave, the ratio of strip width to spacing predetermined by the desired fraction of cross-polarization in the return signal, the strip width being small compared to the wavelength of the incoming wave, and including a Luneberg lens, said strips being positioned essentially in the focal surface of said lens, and wherein the width of said strips is small compared to the focal spot diameter of said lens.

3. Passive cross-polarizing radar reflector means comprising spaced strips of reflecting material aligned at 45° to the E vector of a linearly polarized incoming electromagnetic wave, the ratio of strip width to spacing predetermined by the desired fraction of cross-polarization in the return signal, the strip width being small compared to the wavelength of the incoming wave, and including a Luneberg lens whose focal surface lies outside the surface of said lens, said reflector strips being positioned essentialy in said focal surface and being fixed relative to the rear surface of said lens by at least one radio-transparent spacer bonded therebetween.

4. A passive cross-polarizing radar reflector comprising spaced strips of reflecting material aligned at 45° to the E vector of a linearly polarized incoming electromagnetic wave, the ratio of strip width to spacing predetermined by the desired fraction of cross-polarization in the return signal, the strip width being small compared to the wavelength of the incoming wave, and including a Luneberg lens, said reflector being spherical in shape and positioned in the focal surface of said lens to extend throughout a solid central angle of at least 140° on the rear side of said lens.

5. Apparatus in accordance with claim 4 wherein said reflecting strips comprise a series of curved strips on the surface of said reflector, said strips always bisecting the angle between the longitude line and the latitude line at all points, and strips tapering narrower in width toward the poles, and said ratio of strip width to spacing remaining constant at all points.

6. A passive cross-polarizing radar reflector comprising spaced parallel strips of reflecting material placed perpendicular to the propagation direction of an incident electromagnetic wave, the ratio of strip width to spacing being from about 12:1 to give a desired fraction of cross-polarization in the return signal, the strip width being small compared to the wavelength of the incident wave.

* * * * *